US010925405B2

United States Patent
Dorsainvil et al.

(10) Patent No.: US 10,925,405 B2
(45) Date of Patent: Feb. 23, 2021

(54) SOLAR CHARGED BEACH CHAIR ASSEMBLY

(71) Applicants: Vladimir Dorsainvil, Fort Meyers, FL (US); Hymsline Dorsainvil, Fort Meyers, FL (US)

(72) Inventors: Vladimir Dorsainvil, Fort Meyers, FL (US); Hymsline Dorsainvil, Fort Meyers, FL (US)

( * ) Notice: Subject to any disclaimer, the term of this patent is extended or adjusted under 35 U.S.C. 154(b) by 0 days.

(21) Appl. No.: 16/509,034

(22) Filed: Jul. 11, 2019

(65) Prior Publication Data

US 2021/0007498 A1    Jan. 14, 2021

(51) Int. Cl.

| A47C 1/14 | (2006.01) |
|---|---|
| A47C 4/28 | (2006.01) |
| A47C 4/30 | (2006.01) |
| A47C 7/72 | (2006.01) |
| A47C 1/121 | (2006.01) |
| H01R 25/00 | (2006.01) |
| H01R 24/60 | (2011.01) |
| H02J 7/35 | (2006.01) |
| H02J 7/34 | (2006.01) |

(52) U.S. Cl.
CPC .............. *A47C 7/72* (2013.01); *A47C 1/121* (2013.01); *A47C 1/143* (2013.01); *H01R 24/60* (2013.01); *H01R 25/006* (2013.01); *H02J 7/342* (2020.01); *H02J 7/35* (2013.01)

(58) Field of Classification Search
CPC .. A47C 1/143; A47C 7/72; A47C 7/62; A47C 7/66; A45F 2005/002
See application file for complete search history.

(56) References Cited

U.S. PATENT DOCUMENTS

| D296,618 S | 7/1988 | Colby | |
|---|---|---|---|
| 5,013,085 A | 5/1991 | Craig | |
| 5,579,909 A * | 12/1996 | Deal | A47B 81/005 206/1.5 |
| 5,975,630 A * | 11/1999 | Schreiber | A47C 1/14 297/217.3 |
| 7,249,799 B2 * | 7/2007 | Luce | A47C 7/62 220/751 |
| 8,002,349 B1 * | 8/2011 | Pizzuto | A47C 1/143 297/184.11 |
| 8,534,753 B1 * | 9/2013 | Perez | A47C 7/72 297/188.09 |
| 8,789,884 B1 * | 7/2014 | Edelman | A47C 7/72 297/188.13 |

(Continued)

*Primary Examiner* — Shin H Kim (57) ABSTRACT

A solar charged beach chair assembly includes a beach chair that is comprised of a fluid impermeable material. Thus, the beach chair can be employed at a beach or other environment with water. The beach chair includes a pair of arm rests and a back rest portion, and each of the arm rests has a storage well therein. A pair of doors is each hingedly coupled to a respective one of the arm rests. Each of the doors is aligned with the storage well in the respective arm rest for closing the storage well. A plurality of charge ports is each recessed into a respective one of the arm rests. Each of the charge ports can have an electronic device plugged therein. A power supply is provided and the power supply is coupled to the beach chair. Each of the light emitters, the speakers and the charge ports is electrically coupled to the power supply.

4 Claims, 6 Drawing Sheets

(56) References Cited

U.S. PATENT DOCUMENTS

| | | | |
|---|---|---|---|
| 8,864,221 B1* | 10/2014 | Delvilla | A47C 7/62 |
| | | | 297/180.11 |
| 9,039,077 B1* | 5/2015 | Santamaria | A47C 1/146 |
| | | | 297/31 |
| 9,185,982 B2* | 11/2015 | Kilzer | A47C 1/022 |
| 9,185,988 B1 | 11/2015 | Sanchez | |
| 9,339,114 B2* | 5/2016 | Strolka-Echols | A47C 20/041 |
| 9,375,092 B2* | 6/2016 | Edelman | A47C 7/744 |
| 9,390,571 B1 | 7/2016 | Kupfer | |
| 10,390,624 B2* | 8/2019 | Edelman | H02J 7/35 |
| 10,633,911 B2* | 4/2020 | Edelman | A47C 7/62 |
| 2004/0085755 A1 | 5/2004 | Dupont | |
| 2011/0193372 A1* | 8/2011 | Pizzuto | A47C 7/72 |
| | | | 297/16.1 |
| 2012/0205951 A1* | 8/2012 | Strolka-Echols | A47C 21/06 |
| | | | 297/217.3 |
| 2012/0305414 A1* | 12/2012 | Magnus | A45C 11/00 |
| | | | 206/216 |
| 2013/0154315 A1* | 6/2013 | Kilzer | A47C 4/04 |
| | | | 297/180.13 |
| 2014/0265462 A1* | 9/2014 | Fleming | A47C 7/744 |
| | | | 297/180.14 |
| 2015/0069799 A1* | 3/2015 | Edelman | A47C 7/744 |
| | | | 297/188.01 |
| 2016/0120321 A1* | 5/2016 | Callahan | E05G 1/005 |
| | | | 297/188.01 |
| 2016/0302580 A1* | 10/2016 | Edelman | A47C 7/72 |
| 2019/0145153 A1* | 5/2019 | Edelman | H01L 31/042 |
| | | | 297/188.01 |
| 2020/0054142 A1* | 2/2020 | Edelman | E05G 1/026 |

* cited by examiner

SOLAR CHARGED BEACH CHAIR ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to beach chair devices and more particularly pertains to a new beach chair device for charging electronic devices in a remote location.

BRIEF SUMMARY OF THE INVENTION

An embodiment of the disclosure meets the needs presented above by generally comprising a beach chair that is comprised of a fluid impermeable material. Thus, the beach chair can be employed at a beach or other environment with water. The beach chair includes a pair of arm rests and a back rest portion, and each of the arm rests has a storage well therein. A pair of doors is each hingedly coupled to a respective one of the arm rests. Each of the doors is aligned with the storage well in the respective arm rest for closing the storage well. A plurality of charge ports is each recessed into a respective one of the arm rests. Each of the charge ports can have an electronic device plugged therein. A power supply is provided and the power supply is coupled to the beach chair. Each of the light emitters, the speakers and the charge ports is electrically coupled to the power supply.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
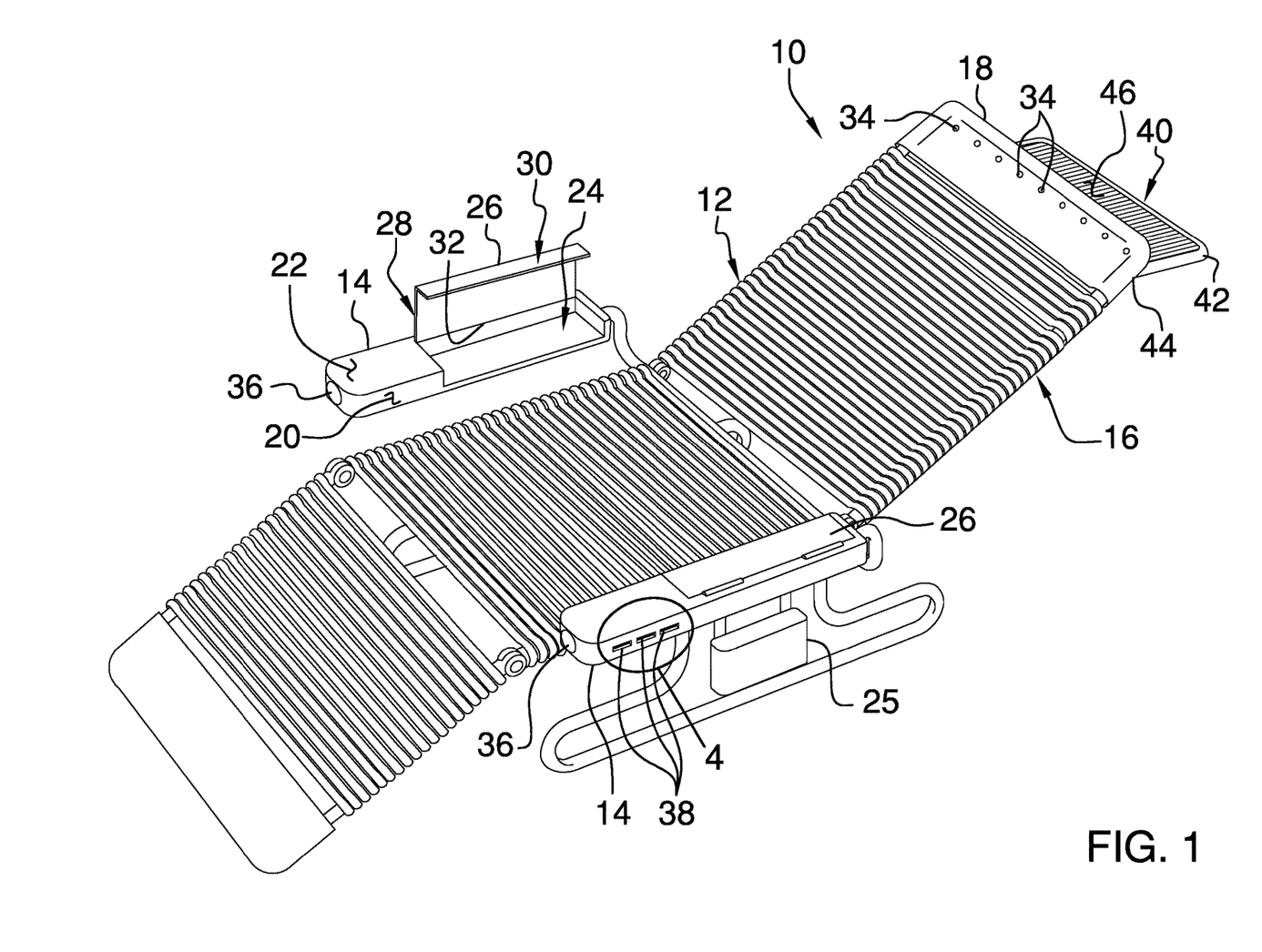
FIG. 1 is a top perspective view of a solar charged beach chair assembly according to an embodiment of the disclosure.
Figure 2:
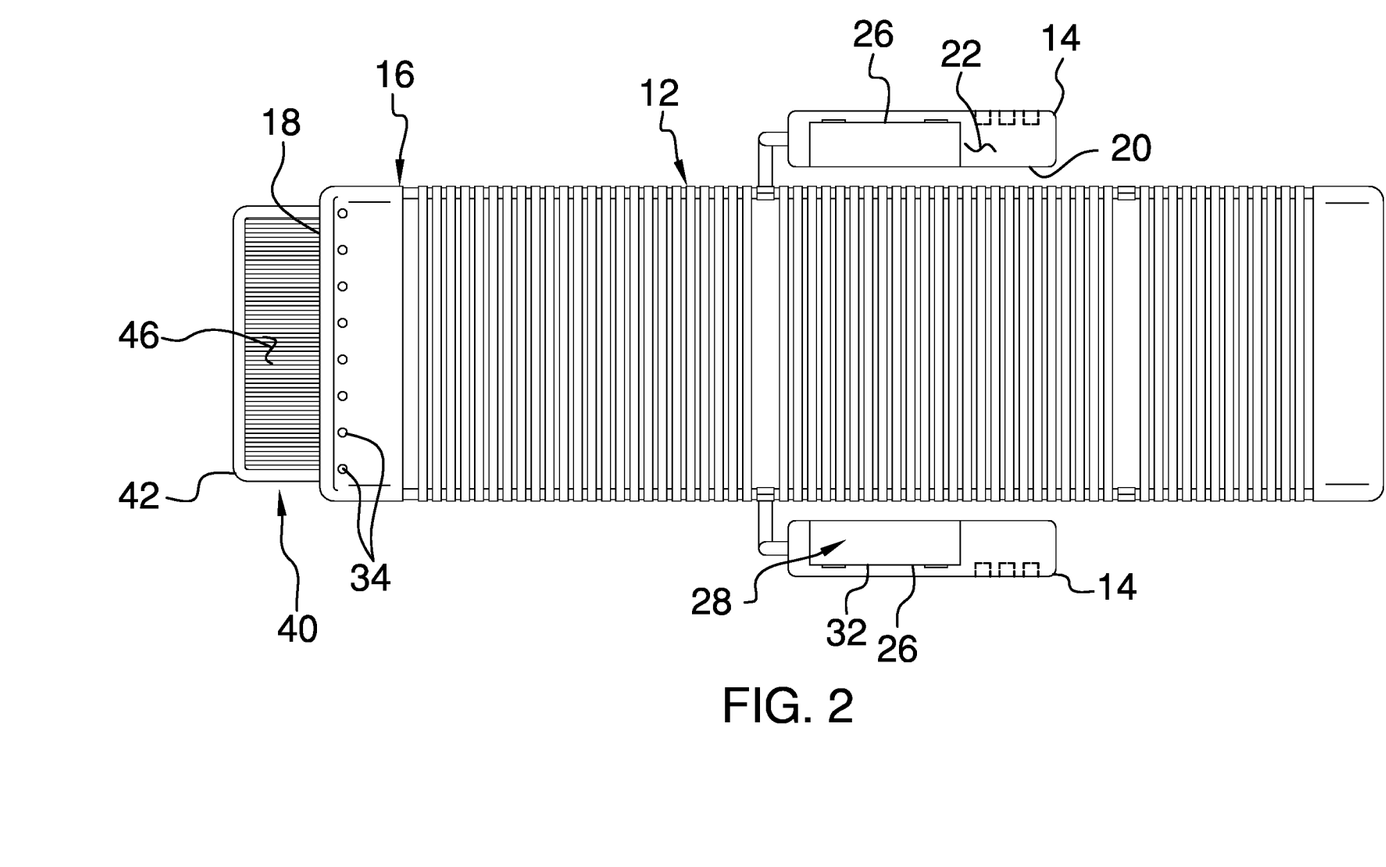
FIG. 2 is a top view of an embodiment of the disclosure.
Figure 3:
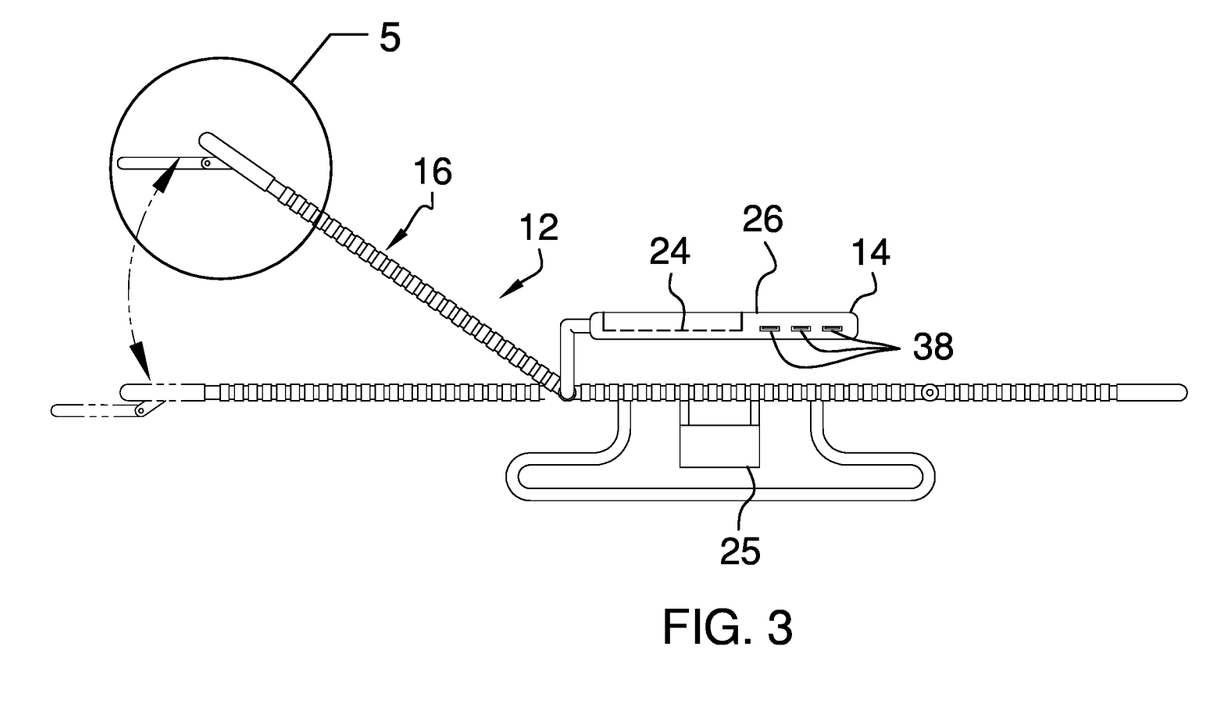
FIG. 3 is a left side view of an embodiment of the disclosure.
Figure 4:
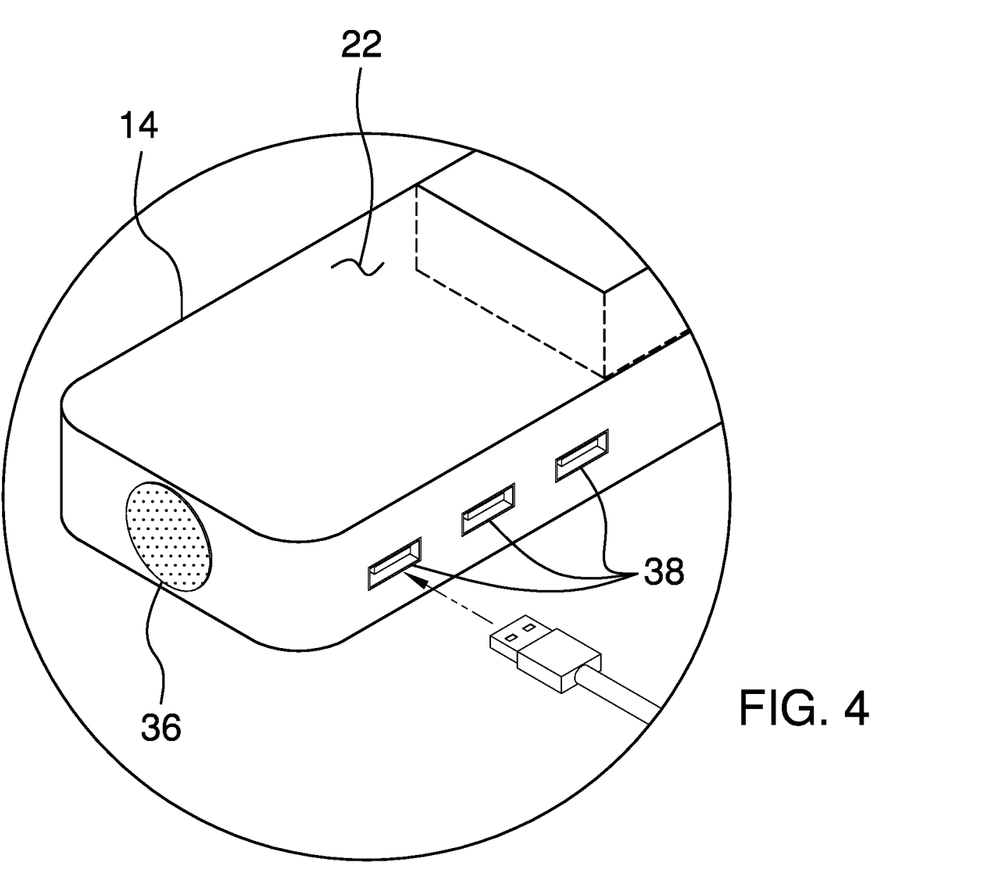
FIG. 4 is a detail view taken from circle 4 FIG. 1 of an embodiment of the disclosure.
Figure 5:
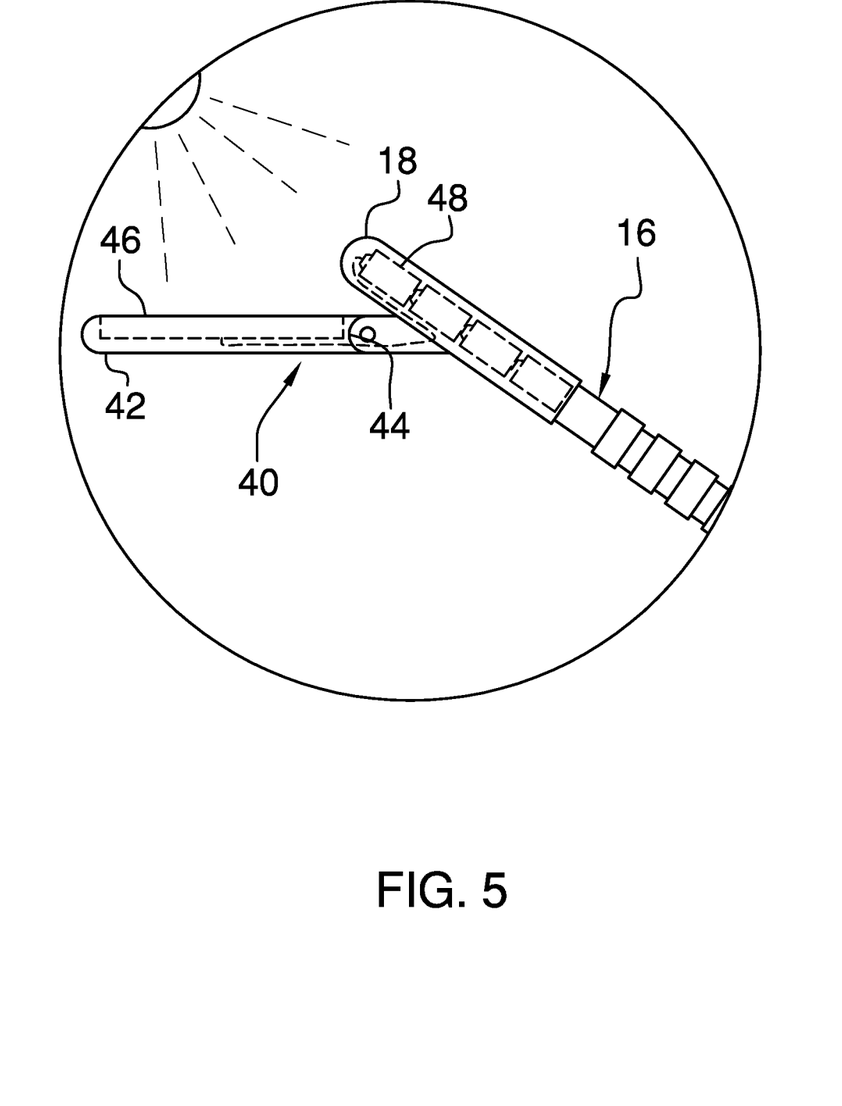
FIG. 5 is a phantom detail view taken from circle 5 of FIG. 3 of an embodiment of the disclosure.
Figure 6:
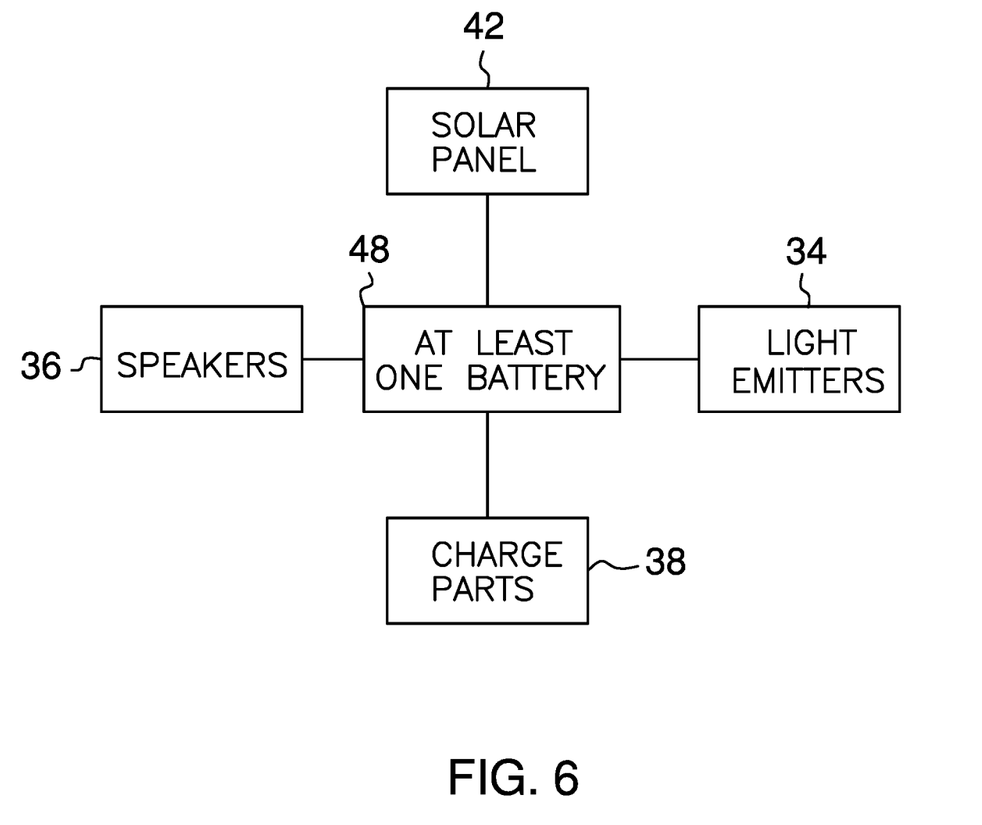
FIG. 6 is a schematic view of an embodiment of the disclosure.

With reference now to the drawings, and in particular to FIGS. 1 through 6 thereof, a new beach chair device embodying the principles and concepts of an embodiment of the disclosure and generally designated by the reference numeral 10 will be described.

As best illustrated in FIGS. 1 through 6, the solar charged beach chair assembly 10 generally comprises a beach chair 12 that is comprised of a fluid impermeable material, such as plastic or the like. Thus, the beach chair 12 can be employed at a beach or other environment with water without being structurally compromised. The beach chair 12 includes a pair of arm rests 14 and a back rest portion 16. The back rest portion 16 has an upper edge 18, and each of the arm rests 14 has a first lateral surface 20 and a top surface 22. Moreover, each of the arm rests 14 has a storage well 24 extending into the top surface 22 and intersecting the first lateral surface 20. The beach chair 12 may include a seat portion and a leg rest portion similar to that of a lawn chair. The beach chair 12 may include foldable legs, stationary legs, or any other type of legs found on portable, outdoor chairs. A pouch 25 is suspended from a respective one of the arm rests 14 for storing an electronic device or the like.

A pair of doors 26 is each hingedly coupled to a respective one of the arm rests 14. Each of the doors 26 is aligned with the storage well 24 in the respective arm rest 14 for closing the storage well 24. Each of the doors 26 has a first portion 28 forming an angle with a second portion 30, and the first portion 28 of each of the doors 26 has a first lateral edge 32. The first lateral edge 32 of the first portion 28 of each of the doors 26 is hingedly coupled to the top surface 22 of the respective arm rest 14. The first portion 28 of each of the doors 26 covers the storage well 24 in the top surface 22 of the respective arm rest 14 when the doors 26 are closed. Additionally, the second portion 30 of each of the doors 26 covers the storage well 24 in the first lateral surface 20 of the respective arm rest 14 when the doors 26 are closed.

A plurality of light emitters 34 is each coupled to the beach chair 12 and each of the light emitters 34 emits light outwardly therefrom when the light emitters 34 are turned on. In this way the light emitters 34 enhance visibility of the beach chair 12 at night. Each of the light emitters 34 may comprise an LED or the like. A plurality of speakers 36 is included and each of the speakers 36 is coupled to the beach chair 12 for emitting audible sounds outwardly therefrom. Each of the speakers 36 is placed in selective electrical communication with an extrinsic audio source for receiving an audio signal therefrom. Additionally, each of the speakers 36 may be Bluetooth speakers or the like thereby facilitating wireless communication with the extrinsic audio source.

A plurality of charge ports 38 is each recessed into a respective one of the arm rests 14 and each of the charge ports 38 can have an electronic device plugged therein. Each of the charge ports 38 is positioned on the first lateral surface 20 of the respective arm rest 14. Additionally, each of the charge ports 38 may be usb ports or the like, and the electronic device may be a smart phone or any other battery powered device. A power supply 40 is coupled to the beach chair 12, and each of the light emitters 34, the speakers 36 and the charge ports 38 is electrically coupled to the power supply 40.

The power supply 40 comprises a solar panel 42 that has a first edge 44 and a first surface 46. The first edge 44 is hingedly coupled to the upper edge 18 of the back rest portion 16 of the beach chair 12. Thus, the solar panel 42 is positionable at a selected angle with respect to the back rest portion 16 thereby facilitating the first surface 46 of the solar panel 42 to be exposed to sunlight. The first surface 46 of the solar panel 42 may comprise a plurality of solar cells or the like thereby facilitating the first surface 46 of the solar panel 42 to convert solar energy into electrical energy. At least one battery 48 is integrated into the beach chair 12 and the at least one battery 48 is electrically coupled to the solar panel 42. Thus, the solar panel 42 charges the at least one battery 48. Additionally, the at least one battery 48 is electrically coupled to each of the light emitters 34, the speakers 36 and each of the charge ports 38.

In use, the beach chair 12 is taken to the beach or any other outdoor location. The solar panel 42 is positioned at the optimum angle to expose the solar panel 42 to sunlight and thusly charge the at least one battery 48. Thus, one or more electronic devices can be plugged into the charge ports 38 in order to recharge the electronic devices. In this way the beach chair 12 enhances the battery life of the electronic devices while the electronic devices are being used at the beach or other outdoor location.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A solar charged beach chair assembly having battery charging capabilities wherein said assembly is configured to charge electronic devices while outdoors, said assembly comprising:

a beach chair being comprised of a fluid impermeable material wherein said beach chair is configured to be employed at a beach or other environment with water, said beach chair including a pair of arm rests and a back rest portion, each of said arm rests having a storage well therein;

a pair of doors, each of said doors being hingedly coupled to a respective one of said arm rests, each of said doors being aligned with said storage well in said respective arm rest for closing said storage well;

a plurality of light emitters, each of said light emitters being coupled to said beach chair, each of said light emitters emitting light outwardly therefrom when said light emitters are turned on wherein said light emitters are configured to enhance visibility of said beach chair at night;

a plurality of speakers, each of said speakers being coupled to said beach chair wherein each of said speakers is configured to emit audible sounds outwardly therefrom, each of said speakers being placed in selective electrical communication with an extrinsic audio source for receiving an audio signal therefrom;

a plurality of charge ports, each of said charge ports being recessed into a respective one of said arm rests wherein each of said charge ports is configured to have an electronic device plugged therein;

a power supply being coupled to said beach chair, each of said light emitters, said speakers and said charge ports being electrically coupled to said power supply;

each of said arm rests having a first lateral surface and a top surface, said storage well in each of said arm rests extending into said top surface and intersecting said first lateral surface; and each of said doors having a first portion forming an angle with a second portion, said first portion of each of said doors having a first lateral edge, said first lateral edge of said first portion of each of said doors being hingedly coupled to said top surface of said respective arm rest, said first portion of each of said doors covering said storage well in said top surface of said respective arm rest when said doors are closed, said second portion of each of said doors covering said storage well in said first lateral surface of said respective arm rest when said doors are closed.

2. A solar charged beach chair assembly having battery charging capabilities wherein said assembly is configured to charge electronic devices while outdoors, said assembly comprising:

a beach chair being comprised of a fluid impermeable material wherein said beach chair is configured to be employed at a beach or other environment with water, said beach chair including a pair of arm rests and a back rest portion, each of said arm rests having a storage well therein;

a pair of doors, each of said doors being hingedly coupled to a respective one of said arm rests, each of said doors being aligned with said storage well in said respective arm rest for closing said storage well;

a plurality of light emitters, each of said light emitters being coupled to said beach chair, each of said light emitters emitting light outwardly therefrom when said light emitters are turned on wherein said light emitters are configured to enhance visibility of said beach chair at night;
a plurality of speakers, each of said speakers being coupled to said beach chair wherein each of said speakers is configured to emit audible sounds outwardly therefrom, each of said speakers being placed in selective electrical communication with an extrinsic audio source for receiving an audio signal therefrom;
a plurality of charge ports, each of said charge ports being recessed into a respective one of said arm rests wherein each of said charge ports is configured to have an electronic device plugged therein;
a power supply being coupled to said beach chair, each of said light emitters, said speakers and said charge ports being electrically coupled to said power supply;
said back rest portion of said beach chair having an upper edge; and
said power supply comprising a solar panel having a first edge and a first surface, said first edge being hingedly coupled to said upper edge of said back rest portion of said beach chair, said solar panel being positionable at a selected angle with respect to said back rest portion wherein said first surface of said solar panel is configured to be exposed to sunlight.

3. The assembly according to claim 2, wherein said power supply comprises at least one battery being integrated into said beach chair, said at least one battery being electrically coupled to said solar panel such that said solar panel charges said at least one battery, said at least one battery being electrically coupled to each of said light emitters, said speakers and each of said charge ports.

4. A solar charged beach chair assembly having battery charging capabilities wherein said assembly is configured to charge electronic devices while outdoors, said assembly comprising:
a beach chair being comprised of a fluid impermeable material wherein said beach chair is configured to be employed at a beach or other environment with water, said beach chair including a pair of arm rests and a back rest portion, said back rest portion having an upper edge, each of said arm rests having a first lateral surface and a top surface, each of said arm rests having a storage well extending into said top surface and intersecting said first lateral surface;
a pair of doors, each of said doors being hingedly coupled to a respective one of said arm rests, each of said doors being aligned with said storage well in said respective arm rest for closing said storage well, each of said doors having a first portion forming an angle with a second portion, said first portion of each of said doors having a first lateral edge, said first lateral edge of said first portion of each of said doors being hingedly coupled to said top surface of said respective arm rest, said first portion of each of said doors covering said storage well in said top surface of said respective arm rest when said doors are closed, said second portion of each of said doors covering said storage well in said first lateral surface of said respective arm rest when said doors are closed;
a plurality of light emitters, each of said light emitters being coupled to said beach chair, each of said light emitters emitting light outwardly therefrom when said light emitters are turned on wherein said light emitters are configured to enhance visibility of said beach chair at night;
a plurality of speakers, each of said speakers being coupled to said beach chair wherein each of said speakers is configured to emit audible sounds outwardly therefrom, each of said speakers being placed in selective electrical communication with an extrinsic audio source for receiving an audio signal therefrom;
a plurality of charge ports, each of said charge ports being recessed into a respective one of said arm rests wherein each of said charge ports is configured to have an electronic device plugged therein, each of said charge ports being positioned on said first lateral surface of said respective arm rest; and
a power supply being coupled to said beach chair, each of said light emitters, said speakers and said charge ports being electrically coupled to said power supply, said power supply comprising:
a solar panel having a first edge and a first surface, said first edge being hingedly coupled to said upper edge of said back rest portion of said beach chair, said solar panel being positionable at a selected angle with respect to said back rest portion wherein said first surface of said solar panel is configured to be exposed to sunlight; and
at least one battery being integrated into said beach chair, said at least one battery being electrically coupled to said solar panel such that said solar panel charges said at least one battery, said at least one battery being electrically coupled to each of said light emitters, said speakers and each of said charge ports.

* * * * *